United States Patent
Zuk et al.

(10) Patent No.: US 9,491,047 B2
(45) Date of Patent: Nov. 8, 2016

(54) MANAGING NETWORK DEVICES

(71) Applicant: Palo Alto Networks, Inc., Santa Clara, CA (US)

(72) Inventors: Nir Zuk, Menlo Park, CA (US); Ravi Ithal, Fremont, CA (US); Anupam Bharali, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 213 days.

(21) Appl. No.: 13/759,896

(22) Filed: Feb. 5, 2013

(65) Prior Publication Data

US 2013/0198348 A1    Aug. 1, 2013

Related U.S. Application Data

(63) Continuation of application No. 13/335,745, filed on Dec. 22, 2011, now Pat. No. 8,438,252, which is a continuation of application No. 12/433,728, filed on Apr. 30, 2009, now Pat. No. 8,108,495.

(51) Int. Cl.
| | |
|---|---|
| *G06F 15/177* | (2006.01) |
| *H04L 12/24* | (2006.01) |
| *H04L 12/46* | (2006.01) |
| *H04L 29/08* | (2006.01) |
| *H04L 29/06* | (2006.01) |

(52) U.S. Cl.
CPC ........... *H04L 41/08* (2013.01); *H04L 12/4679* (2013.01); *H04L 41/0853* (2013.01); *H04L 67/10* (2013.01); *H04L 63/0272* (2013.01)

(58) Field of Classification Search
USPC ....................................................... 709/220
See application file for complete search history.

(56) References Cited

U.S. PATENT DOCUMENTS

| | | | | |
|---|---|---|---|---|
| 6,292,792 | B1 * | 9/2001 | Baffes | G06N 5/022 706/45 |
| 6,389,464 | B1 * | 5/2002 | Krishnamurthy | H04L 41/0213 709/220 |
| 6,704,401 | B2 * | 3/2004 | Piepho | H04L 12/2856 379/102.03 |
| 6,816,903 | B1 * | 11/2004 | Rakoshitz | H04L 12/2602 370/230 |
| 6,925,490 | B1 * | 8/2005 | Novaes | G06F 9/465 709/201 |
| 7,100,053 | B1 * | 8/2006 | Brown | H04L 63/20 713/185 |
| 7,152,099 | B1 * | 12/2006 | Arens | H04L 29/12235 370/389 |
| 7,185,073 | B1 * | 2/2007 | Gai | H04L 41/0893 709/221 |

(Continued)

*Primary Examiner* — Alicia Baturay
(74) *Attorney, Agent, or Firm* — Van Pelt, Yi & James LLP

(57) ABSTRACT

Methods, systems, and apparatus, including computer programs encoded on a computer storage medium, for managing network devices. A central management system stores shared configuration objects in a central configuration database. A network device stores shared configuration objects and device-specific configuration objects in a local configuration database. The local configuration database's shared configuration objects correspond to shared configuration objects in the central configuration database. The network device can be configured locally or using the central management system.

20 Claims, 8 Drawing Sheets

(56) References Cited

U.S. PATENT DOCUMENTS

| | | | | |
|---|---|---|---|---|
| 7,200,648 B2* | 4/2007 | Huang | H04L 41/0806 | 707/999.003 |
| 7,395,322 B2* | 7/2008 | Harvey | H04L 67/303 | 709/203 |
| 7,421,484 B2* | 9/2008 | Das | H04L 29/06 | 709/220 |
| 7,428,583 B1* | 9/2008 | Lortz | H04L 41/0893 | 709/221 |
| 7,555,749 B2* | 6/2009 | Wickham | G06F 8/65 | 717/168 |
| 7,568,195 B2* | 7/2009 | Markley | G06F 8/65 | 717/170 |
| 7,584,467 B2* | 9/2009 | Wickham | G06F 8/65 | 717/171 |
| 7,650,396 B2* | 1/2010 | Tindal | H04L 41/0226 | 709/201 |
| 7,760,746 B2* | 7/2010 | Betts | G06F 9/44505 | 370/408 |
| 7,769,009 B1* | 8/2010 | Katzer | H04W 76/023 | 370/312 |
| 7,792,930 B1* | 9/2010 | Zhang | H04L 41/082 | 709/220 |
| 7,814,120 B2* | 10/2010 | Tsutazawa | H04L 12/581 | 707/609 |
| 7,987,264 B1* | 7/2011 | Gill | H04L 41/0816 | 370/392 |
| 7,996,896 B2* | 8/2011 | Durie | G06F 21/55 | 709/224 |
| 8,046,531 B2* | 10/2011 | Ooigawa | G06F 17/30067 | 711/103 |
| 8,108,495 B1* | 1/2012 | Zuk | H04L 12/4679 | 709/220 |
| 8,145,784 B2* | 3/2012 | See | H04L 41/0213 | 370/412 |
| 8,205,000 B2* | 6/2012 | Chang | H04L 12/2602 | 370/235 |
| 8,214,473 B1* | 7/2012 | Wexler | G06F 9/4411 | 709/223 |
| 8,284,699 B1* | 10/2012 | Zuk | H04L 41/084 | 370/254 |
| 8,438,252 B2* | 5/2013 | Zuk | H04L 12/4679 | 709/220 |
| 9,088,571 B2* | 7/2015 | Bryan | | |
| 9,143,511 B2* | 9/2015 | Bryan | H04L 63/10 | |
| 2002/0069271 A1* | 6/2002 | Tindal | H04L 41/069 | 709/221 |
| 2002/0124067 A1* | 9/2002 | Parupudi | G06F 21/62 | 709/223 |
| 2002/0143914 A1* | 10/2002 | Cihula | H04L 41/0893 | 709/223 |
| 2002/0161888 A1* | 10/2002 | McGuire | H04L 41/0213 | 709/226 |
| 2003/0023587 A1* | 1/2003 | Dennis | G06F 21/10 | |
| 2003/0037128 A1* | 2/2003 | Beadles | H04L 29/06 | 709/220 |
| 2003/0125028 A1* | 7/2003 | Reynolds | H04W 36/24 | 455/437 |
| 2003/0229501 A1* | 12/2003 | Copeland | G06Q 10/10 | 709/225 |
| 2004/0111494 A1* | 6/2004 | Kostic | H04L 29/12216 | 709/220 |
| 2005/0021626 A1* | 1/2005 | Prajapat et al. | | 709/205 |
| 2006/0136986 A1* | 6/2006 | Doolittle | G06F 11/3006 | 726/1 |
| 2006/0168158 A1* | 7/2006 | Das | H04L 29/06 | 709/220 |
| 2006/0190575 A1* | 8/2006 | Harvey | H04L 67/303 | 709/222 |
| 2006/0242072 A1* | 10/2006 | Peled | G06Q 30/02 | 705/51 |
| 2007/0033646 A1* | 2/2007 | Tosey et al. | | 726/15 |
| 2007/0233826 A1* | 10/2007 | Tindal | H04L 12/2602 | 709/220 |
| 2007/0244997 A1* | 10/2007 | Tindal | H04L 41/0843 | 709/220 |
| 2007/0244998 A1* | 10/2007 | Tindal | H04L 41/0226 | 709/220 |
| 2007/0268506 A1* | 11/2007 | Zeldin | H04L 41/0806 | 358/1.13 |
| 2007/0268514 A1* | 11/2007 | Zeldin et al. | | 358/1.15 |
| 2007/0268515 A1* | 11/2007 | Freund | H04L 67/34 | 358/1.15 |
| 2008/0033845 A1* | 2/2008 | McBride | G06Q 10/087 | 705/28 |
| 2008/0201763 A1* | 8/2008 | Lynn | H04L 41/0893 | 726/1 |
| 2009/0282129 A9* | 11/2009 | Tindal | H04L 41/0226 | 709/220 |
| 2010/0131618 A1* | 5/2010 | Brewis | H04L 41/0806 | 709/220 |
| 2010/0131619 A1* | 5/2010 | Brewis | H04L 41/0806 | 709/220 |
| 2010/0131622 A1* | 5/2010 | Brewis | H04L 67/303 | 709/221 |
| 2014/0130056 A1* | 5/2014 | Goodman | G06F 9/5044 | 718/104 |

* cited by examiner

| Priority | Configuration Object | Respective Value | Shared/Device Specific |
|---|---|---|---|
| 1 | Security Policy: Address Range to Block | 100-200 | Device Specific |
| 2 | Security Policy: Address Range to Allow | 100-150 | Shared |
| 3 | DNS Server Address | 300 | Shared |
| 4 | DNS Server Address | 400 | Device Specific |

FIG. 4A

| Device Specific Configuration Objects | |
|---|---|
| Configuration Object | Respective Value |
| Security Policy: Address Range to Block | 100-200 |
| DNS Server Address | 400 |

| Shared Configuration Objects | |
|---|---|
| Configuration Object | Respective Value |
| Security Policy: Address Range to Allow | 100-150 |
| DNS Server Address | 300 |

FIG. 4B

MANAGING NETWORK DEVICES

CROSS REFERENCE TO OTHER APPLICATIONS

This application is a continuation of co-pending U.S. patent application Ser. No. 13/335,745, entitled MANAGING NETWORK DEVICES filed Dec. 22, 2011 which is incorporated herein by reference for all purposes, which is a continuation of U.S. patent application Ser. No. 12/433,728, now U.S. Pat. No. 8,108,495, entitled MANAGING NETWORK DEVICES filed Apr. 30, 2009 which is incorporated herein by reference for all purposes.

BACKGROUND OF THE INVENTION

Network administrators typically manage network devices in computer networks by configuring and reconfiguring the network devices. For example, network administrators configure firewalls and routers within computer networks to have appropriate security and routing policies. If, for example, a network is expanded or modified, a network administrator can reconfigure network devices with new policies or other configuration information.

Network administrators manage some network devices using a device management model (sometime referred to as remote management). Using a device management model, a network administrator can configure a network device by directly contacting the network device. For example, for some network devices, a network administrator can log in to the network device using a web browser on a computer on the network.

Network administrators manage other network devices using a central management model. Using a central management model, a network administrator creates configuration information at a central database and then pushes the configuration information from the central database to network devices. For example, for some networks devices, a network administrator enters configuration information at a central management system that sends the configuration information to network devices.

SUMMARY

In general, one or more aspects of the subject matter described in this specification can be embodied in one or more methods performed by a central management system for configuring a plurality of network devices. The methods include storing a plurality of shared configuration objects in a central configuration database for the central management system. The central management system receives a first request to update a respective value of a first shared configuration object in the central configuration database with a first new value and updates the respective value of the first shared configuration object in the central configuration database with the first new value.

Responsive to the first, request, the central management system selects the plurality of network devices each storing a configuration object corresponding to the first shared configuration object of the central configuration database in a local configuration database. The central management system sends the first new value to the selected network devices where each network device updates a respective value of the network device's configuration object corresponding to the first shared configuration object in the network device's local configuration database with the first new value, and where the updated configuration object is used by the network device to configure how the network device processes a first plurality of packets.

The central management system receives a second request to update a respective value of a device-specific configuration object with a second new value, where the device-specific configuration object is not stored in the central configuration database.

Responsive to the second request, the central management system selects a first network device in the plurality of network devices, where the first network device stores the device-specific configuration object in the first network device's local configuration database. The central management system sends the second new value to the first network device where the first network device updates the respective value of the device-specific configuration object in the first network device's local configuration database with the second new value, and where the updated device-specific configuration object is used by the first device to configure how the first device processes a second plurality of packets. Other embodiments of this aspect include corresponding systems, apparatus, and computer program products.

These and other embodiments can optionally include one or more of the following features. The first network device can be a security device or a Virtual Private Network (VPN) server. The first shared configuration object or the device-specific configuration object can specify a security policy parameter or a VPN policy parameter.

The first network device can be a routing device. The first shared configuration object can specify a Domain Name Service (DNS) server address. The device-specific configuration object can specify a next hop router address.

The first network device can include a priority list specifying a processing order for a plurality of configuration objects in the first network device's local configuration database. The first network device can be configured to select a configuration object of the plurality of configuration objects based on the priority list in order to process a first packet.

The first network device receives a third request not originating from the central management system to update the respective value of the first network device's configuration object corresponding to the first shared configuration object in the first network device's local configuration database. The first network device rejects the third request to change the respective value of the first network device's configuration object corresponding to the first shared configuration object in the network device's local configuration database.

Responsive to the first request, the central management system can select an additional network device, where the additional network device's local configuration database does not store a configuration object corresponding to the first shared configuration object of the central configuration database. The central management system sends the first new value to the additional network device.

In general, one or more aspects of the subject matter described in this specification can be embodied in one or more methods performed by a first network device for configuring the first network device. The methods include storing a plurality of shared configuration objects and a plurality of device-specific configuration objects in a local configuration database for the first network device. Each shared configuration object in the local configuration database corresponds to a shared configuration object in a central configuration database for a central management system. Each device-specific configuration object is not stored in the central configuration database for the central management system. Each shared configuration object and each device-specific configuration object is used by the first network device to configure how the first network device processes a plurality of packets.

The first network device receives a first request from the central management system to update a respective value of a first shared configuration object in the local configuration database with a first new value and updates the respective value of the first shared configuration object in the local configuration database with the first new value. The first network device receives a second request to update a respective value of a first device-specific configuration object in the local configuration database with a second new value and updates the respective value of the first device-specific configuration object in the local configuration database with the second new value. Other embodiments of this aspect include corresponding systems, apparatus, and computer program products.

These and other embodiments can optionally include one or more of the following features. The first network device can be a security device or a Virtual Private Network (VPN) server. The first shared configuration object or the first device-specific configuration object can specify a security policy parameter or a VPN policy parameter.

The first network device can be a routing device. The first shared configuration object can specify a Domain Name Service (DNS) server address. The first device-specific configuration object can specify a next hop router address.

The first network device can be configured to select a configuration object of a plurality of configuration objects in the local configuration database based on a priority list in order to process a first packet, where the priority list specifies a processing order for the plurality of configuration objects.

The first network device can receive a third request not originating from the central management system to update the respective value of the first shared configuration object in the local configuration database with a third new value. The first network device rejects the third request to update the respective value of the first shared configuration object in the local configuration database.

Particular embodiments of the subject matter described in this specification can be implemented so as to realize one or more of the following advantages. Network administrators can manage network devices at the network devices or at a central management system. Configuration information can be maintained at the network devices, at the central management system, and at both network devices and the central management system. Configuration information can be maintained in two locations and synchronized. Alternatively, configuration information can be maintained so that a given configuration object is maintained at either a network device or the central management system, thus preventing duplicate configuration objects having different associated values. Consequently, network administrators can spend less time managing configuration information for network devices. Network administrators can also quickly fix problems in the field (for example, at a location with network devices but where the central management system is inaccessible), and configuration changes made to fix the problems can then appear immediately at the central management system.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Various embodiments of the invention are disclosed in the following detailed description and the accompanying drawings.

FIG. 4A shows a local configuration database of an example network device represented as a table.

FIG. 4B shows an example local configuration database of an example network device represented as two tables.

Like reference numbers and designations in the various drawings indicate like elements.

DETAILED DESCRIPTION

Figure 1:
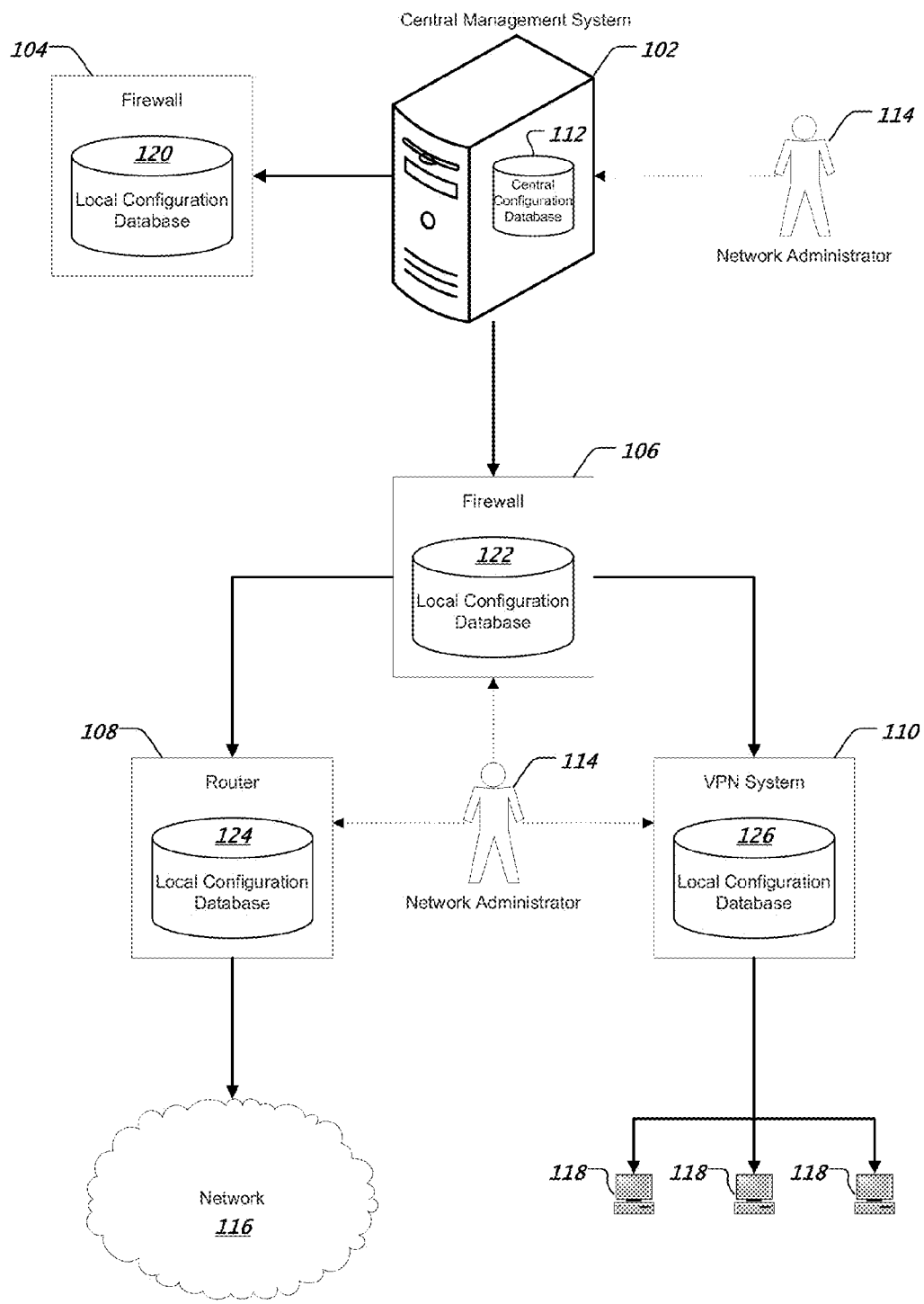
FIG. 1 is a diagram of an example network topology including example network devices and an example central management system.

FIG. 1 is a diagram of an example network topology including example network devices and an example central management system.

The central management system 102 is a system that manages network devices (for example, firewalls 104 and 106, router 108, and Virtual Private Network (VPN) system 110). The central management system 102 is typically one or more computer systems connected to a network (e.g., network 116). A network device is a device that performs one or more tasks related to network traffic. Although security devices (for instance, firewalls, Intrusion Detection Systems (IDSs), Intrusion Prevention Systems (IPSs), and Unified Threat Management (UTM) devices), routers and VPN systems are examples of network devices, various other network devices are possible.

Managing network devices includes monitoring or controlling the network devices, or both. Monitoring the network devices can include polling the network devices (e.g., sending messages to the network devices and receiving response messages) and logging messages from the network devices (e.g., status messages). Controlling the network devices can include sending specific instructions to the network devices (e.g., to perform certain tasks) or sending configuration information to the network devices.

Configuration information is information that specifies how a network device should operate. Configuration information can be specified by configuration objects. In general, a configuration object (also known as a parameter or by other terms) specifies a particular piece of information that a network device uses to process packets. Alternatively, a configuration object specifies information that a network device uses to control user authentication and authorization, process authentication and authorization, or the like.

A configuration object has a respective value. For example, a configuration object that specifies how frequently a network device will send status to the central management system 102 can have a respective value of 1 minute, specifying that the network device will send status information once every minute. In some implementations, a configuration object is represented as one or more name, value pairs such that names serve to identify their respective values. Some configuration objects have more than one respective value, and other configuration objects have respective data structures including a plurality of values. In further implementations, a configuration object is represented as an XML object.

Examples of configuration objects for firewalls include: various security policy parameters; routing information; software updates including updated methods of identifying viruses, spam, and other security threats; and the like. Examples of configuration objects for routers include: updates to routing tables; static route information; and the like. Examples of configuration objects for VPN systems include: authentication parameters; user account information (e.g., for users at workstations 118 communicating with a VPN system 110); and the like. Other configuration objects are possible.

A network administrator 114 manages the central management system 102. The network administrator can interact with the central management system 102 directly (e.g., through input/output devices connected to the central management system 102) or remotely (e.g., by using a computer on a network connected to the central management system 102). In some implementations, the network administrator 114 interacts with the central management system 102 using a web browser or a Secure Shell (SSH) client. For example, in some implementations where the network administrator 114 interacts with the central management system 102 (or a network device) using a web browser, the web browser periodically updates a display device with current configuration information on the central management system 102 or network devices.

The central management system 102 includes a central configuration database 112. A database is collection of information that can be stored in various formats using various computing or storage devices connected by one or more networks or other communication means. Various database management systems, database architectures, database storage structures, and database models are possible (for example, the central management system 102 can use a Relational Database Management System (RBDMS)). The central configuration database 112 includes shared configuration objects. The central configuration database 112 can store the shared configuration objects in various data structures (e.g., tables).

Shared configuration objects are configuration objects that are associated with two or more network devices. For example, a shared configuration object for a firewall (for instance, a security policy) can be associated with a first firewall 104 and a second firewall 106. In some implementations, the central management system 102 associates shared configuration objects with network devices by creating lists of network devices that are associated with shared configuration objects. For example, the lists (or other data structures) can be stored in the shared configuration database 112.

Because shared configuration objects are associated with two or more network devices, it is efficient to maintain shared configuration objects at the central management system 112. When the network administrator 114 needs to update a shared configuration object, the network administrator 114 can update the shared configuration object at the central management system 102 and avoid having to individually update each network device associated with that shared configuration object.

The network devices include local configuration databases (e.g., local configuration databases 120, 122, 124, and 126). A local configuration database includes device-specific configuration objects and shared configuration objects. The local configuration database can store the device-specific configuration objects in various data structures. In some implementations, the local configuration database is not integrated or attached to the network device. For instance, the content of the local configuration database can be distributed among several devices on a network.

Device-specific configuration objects are configuration objects that are associated with a specific network device. For example, a device-specific configuration object for the first firewall 104 can specify an address where the first firewall 104 is to block all packets from that address, and a device-specific configuration object for the second firewall 106 can specify the same address but that the second firewall 106 is to allow all packets from that address to pass. In another example, a device-specific configuration object for the first firewall 104 specifies an IP address for a central management system, Domain Name System (DNS) server, or other management system.

The shared configuration objects in a local configuration database correspond to shared configuration objects in a central configuration database. In some implementations, the local configuration database includes identifiers with each shared configuration object to allow the network device to identify the corresponding shared configuration object at the central configuration database. In some implementations, the central configuration database includes identifiers to identify corresponding shared configuration objects in local configuration databases.

The central management system 102 sends shared configuration objects to the network devices that are associated with the shared configuration objects. The network devices use the shared configuration objects to, for example, configure how the network devices process packets. Examples of processing packets include: determining whether to drop or allow a packet, determining an application associated with a packet, inspecting a packet or several packets for a virus, routing a packet to a destination, authenticating one or more users, and so on. The network devices also use the device-specific configuration objects to process packets.

The network administrator 114 can update the respective values of shared configuration objects at the central management system 102. When the network administrator 114 updates the respective value of a shared configuration object, the central management system 102 updates the shared configuration database 112 and sends the new value to network devices associated with the shared configuration object.

The network administrator 114 can update the respective value of a device-specific configuration object at the central management system 102. When the network administrator 114 updates the respective value of a device-specific configuration object, the central management system 102 sends the new value to the network device that uses the device-specific configuration object. The network device updates its local configuration database. The network administrator 114 can also update device-specific configuration objects in local configuration databases by communicating directly with network devices (that is, not using the central management system).

In some implementations, the network administrator 114 updates several configuration objects on several network devices with a single action. For example, the network administrator 114 can send a group of configuration objects (for instance, using the central management system 102) to a group of network devices. In that case, some of the configuration objects can be irrelevant to some of the network devices, intentionally or unintentionally. Network devices receiving updated values for irrelevant configuration objects can take various actions, for example, discarding the updated values, sending error messages to the central management system 102, storing the irrelevant values in their local configuration databases and not using them, and so on.

In some implementations, the network administrator 114 updates the respective value of a configuration object in a local configuration database (e.g., local configuration database 120) that corresponds to a shared configuration object in a central configuration database (e.g., central configuration database 112). In those cases, the respective value of the shared configuration object in the central configuration database 112 will not match the respective value of the corresponding configuration object in the local configuration database 120.

This condition can cause problems for various reasons. For example, the network administrator 114 can forget that he has updated the respective value at the network device 104 and update a respective value of the corresponding shared configuration object at the central management system 102. In that case, the central management system would send the updated value to the network devices, and the network device 104 that had the updated value would replace its unique value with the updated value from the central management system 102. In another example, multiple network administrators can manage the network, and they can fail to communicate changes to one another.

In some implementations, the network device and the central management system 102 perform other actions to coordinate configuration information. Various other actions are described in reference to FIGS. 2-3 and 5-6.

Figure 2:
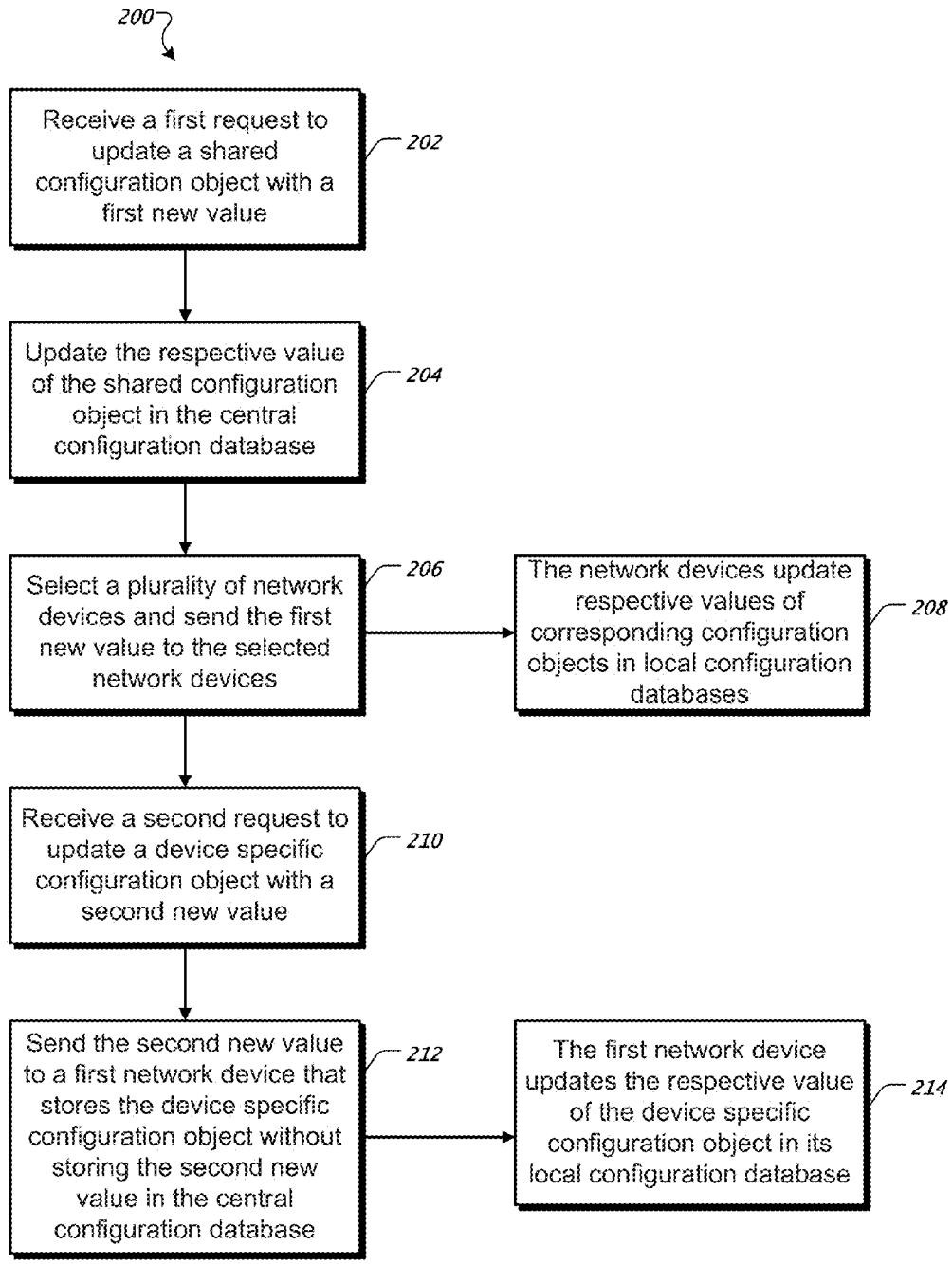
FIG. 2 is a flow diagram of an example technique performed by a central management system for configuring network devices.

FIG. 2 is a flow diagram of an example technique 200 performed by a central management system (e.g., central management system 102, although various central management systems are possible) for configuring network devices (e.g., firewall 106).

The central management system stores shared configuration objects in a central configuration database for the central management system. Each shared configuration object can be used by a network device to process packets.

The central management system receives a request to update a respective value of a first shared configuration object in the central configuration database with a first new value (step 202). In some implementations, the central management system receives the request from a network administrator (e.g., network administrator 114). In other implementations, the central management system receives the first request from a process, for example, a script or other executing software that monitors network conditions and adjusts configuration information depending on the monitored network conditions.

The central management system updates the respective value of the first shared configuration object in the central configuration database with the first new value (step 204). In some implementations, the central management system keeps a copy of the previous value, for example, on a back-up system.

Responsive to a request, the central management system selects one or more network devices and sends the first new value to the selected network devices (step 206). Each of the selected network devices stores a configuration object corresponding to the first shared configuration object of the central configuration database in a local configuration database.

In some implementations, the central management system selects the network devices based on whether those network devices have a configuration object corresponding to the first shared configuration object of the central management system (e.g., whether those network devices are associated with the first shared configuration object). In other implementations, the network administrator 114 selects which devices to update. In some implementations, the central management system keeps track of which network devices are associated with the shared configuration object, for example, in a table, list, or other data structure (for instance, in the shared configuration database). In other implementations, the shared configuration objects are associated with all network devices that the central management system is managing. In those implementations, the central management system does not need to keep track of which network devices are associated with which shared configuration objects. Instead, the central management system sends the shared configuration object to all network devices that it is managing.

In some implementations, the central management system selects an additional network device (or a plurality of additional network devices). The additional network device's local configuration database does not store a configuration object corresponding to the first shared configuration object of the central configuration database. The central management system sends the first new value to the additional network device The additional network device can be selected for various reasons. For example, in some cases, the central management system simply selects all of the network devices that it is managing (for instance, at the direction of a network administrator), including the additional network device, even though the additional network device does not store a configuration object corresponding to the first shared configuration object of the central configuration database.

In those cases, the additional network device can take various actions when it receives the first new value. For example, in some implementations, the additional network device determines that the first shared configuration object of the central configuration database is not relevant (for instance, where the additional network device is not performing routing but the first shared configuration object specifies information used for routing). The additional network device makes the determination using various techniques, for example, by comparing the first shared configuration object with a list of relevant configuration objects. The additional network device optionally sends an error message to the central management system when it determines that the first shared configuration object is not relevant.

In another example, the additional network device creates a new configuration object in the additional network device's local configuration database corresponding to the first shared configuration object of the central configuration database. The additional network device updates a respective value of the new configuration object in the additional network device's local configuration database with the first new value. If the first shared configuration object of the central configuration database is not relevant to the additional network device, then the additional network device ignores the first new value although it is stored in the additional network device's local configuration database.

Responsive to receiving the first value, each selected network device updates a respective value of the network device's configuration object corresponding to the first shared configuration object in the network device's local configuration database with the first new value (step 208, not performed by the central management system). In some implementations, the selected network devices acknowledge receipt of the first new value, for example, by sending an acknowledgement message to the central management system.

The central management system receives a subsequent request to update a respective value of a device-specific configuration object with a second new value (step 210). The device-specific configuration object is not stored in the central configuration database. The central management system receives the subsequent request from a network administrator or process or other source.

Although the second new value is temporarily stored at the central management system, it is not persisted. In some implementations, the second new value is sent to a back-up device or archive, but the second new value is not stored in the central configuration database. Consequently, the central management system does not update the central configuration database.

Responsive to the request, the central management system selects a first network device in the plurality of network devices and sends the second new value to the first network device (step 212). The central management system selects the first network device because the first network device stores the device-specific configuration object in the first network device's local configuration database (that is, the device-specific configuration object is specific to the first network device).

The first network device updates the respective value of the device-specific configuration object in the first network device's local configuration database with the second new value (step 214, not performed by the central management system). Typically, the first network device uses the second new value to process packets.

Figure 3:
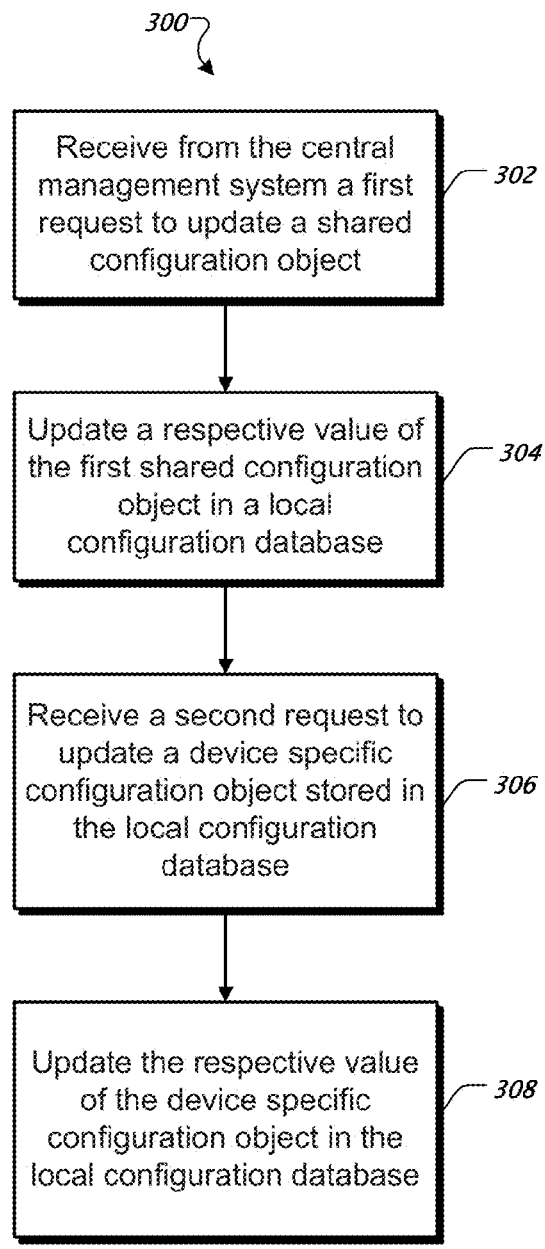
FIG. 3 is a flow diagram of an example technique performed by a first network device for configuring the first network device.

FIG. 3 is a flow diagram of an example technique 300 performed by a first network device (e.g., firewall 106) for configuring the first network device.

The first network device stores shared configuration objects and device-specific configuration objects in a local configuration database for the first network device. Each shared configuration object in the local configuration database corresponds to a shared configuration object in a central configuration database for a central management system (e.g., central management system 102, although various central management systems are possible). Each device-specific configuration object is not stored in the central configuration database for the central management system. Each device-specific configuration object and each shared configuration object can be used by the first network device to process packets at the first network device.

The first network device receives a request from the central management system to update a respective value of a first shared configuration object in the local configuration database with a first new value (step 302). The central management system determined the new value based on, for example, input from a network administrator or from feedback it received from various network devices. In some implementations, the first network device acknowledges receipt of the first new value, for example, by sending an acknowledgement message to the central management system.

The first network device updates the respective value of the first shared configuration object in the local configuration database with the first new value (step 304). In some cases, the first network device processes packets using the first new value.

The first network device receives a subsequent request to change a respective value of a first device-specific configuration object in the local configuration database with a second new value (step 306). The first network device receives the request from, for example, a network administrator accessing the first network device directly. A network administrator can access the device directly by, for example, using input/output devices attached to the network device or using a workstation on a network with the first network device (for instance, using SSH or a web browser). In another example, the first network devices receives the request from the central management system.

The first network device updates the respective value of the first device-specific configuration object in the local configuration database with the second new value (step 308). Typically, the first network device processes packets using the second new value.

If the request did not originate from the central management system, then the first network device does not send the second new value to the central management system unless requested to by, for example, the central management system or a network administrator.

In some implementations, the first network device receives an additional request not originating from the central management system to update the respective value of the first shared configuration object in the local configuration database with a third new value. For example, a network administrator can send the additional request directly to the first network device.

In those implementations, the first network device rejects the additional request. For example, the first network device can send a message to the originator of the request (for instance, the network administrator) indicating that shared configuration objects cannot be changed at network devices because they are managed by a central management system. In these implementations, the first network device takes no action to update the respective value of the shared configuration object in the local configuration database according to the additional request.

FIG. 4A shows a local configuration database of an example network device represented as a table 400. Example device-specific configuration objects and example shared configuration objects are included in the local configuration database.

When the example network device requires configuration information to process packets, the example network device consults the local configuration database for the required configuration information. In some cases, the example network device will determine whether to use a first configuration object or a second configuration object. For example, two configuration objects may specify the same configuration information but have different (that is, conflicting) respective values. In those cases, the example network device resolves a conflict between the two configuration objects. The conflict can be resolved using various techniques.

The table 400 includes a priority list. The priority list specifies a processing order. The example network device processes configuration objects according to the processing order specified by the priority list. For example, the configuration object represented by the first row 402 has a priority of 1 and thus takes priority over the other configuration objects. The configuration object represented by the second row 404 has a priority of 2 and thus takes priority over the other configuration objects except the configuration object represented by the first row 402.

If the network device decides whether to block or allow traffic from an address of 125, the network device will resolve a conflict, typically by following a processing order. The configuration object represented by the first row 402 indicates that traffic from addresses between 100-200 are to be blocked, but the configuration object represented by the second row 404 indicates that traffic from addresses between 100-150 are to be allowed. The network device can use the priority list to determine that the configuration object represented by the first row 402 has priority, and therefore that it will block traffic from an address of 125.

Similarly, the network device determines whether to use a DNS server at address 300 or a DNS server at address 400 by resolving a conflict. The network device determines that the configuration object represented by the third row 406 has priority Although a priority list is explicitly shown in the table 400, it does not need to be explicitly stored or recorded. In some implementations, the network device resolves conflicts by searching through the table 400 in order and using the first configuration object that it finds.

FIG. 4B shows an example local configuration database of an example network device represented as two tables 420 and 430. The first table 420 shows device-specific configuration objects represented by two rows 422 and 424. The second table 430 shows shared configuration objects represented by two rows 432 and 434.

In some implementations, the example network device resolves some conflicts between configuration objects by attributing greater priority to either the device-specific configuration objects or the shared configuration objects. For example, if the example network device attributes greater priority to device-specific configuration objects, then it blocks traffic from an address of 125 because it consults the first table 420 before the second table 430. Similarly, if the example network device attributes greater priority to shared configuration objects, then it uses a DNS server at address 300 because it consults table 430 before table 420.

The network device, in some implementations, can be configured to attribute greater priority to device-specific configuration objects or shared configuration objects using a configuration object.

Figure 5:
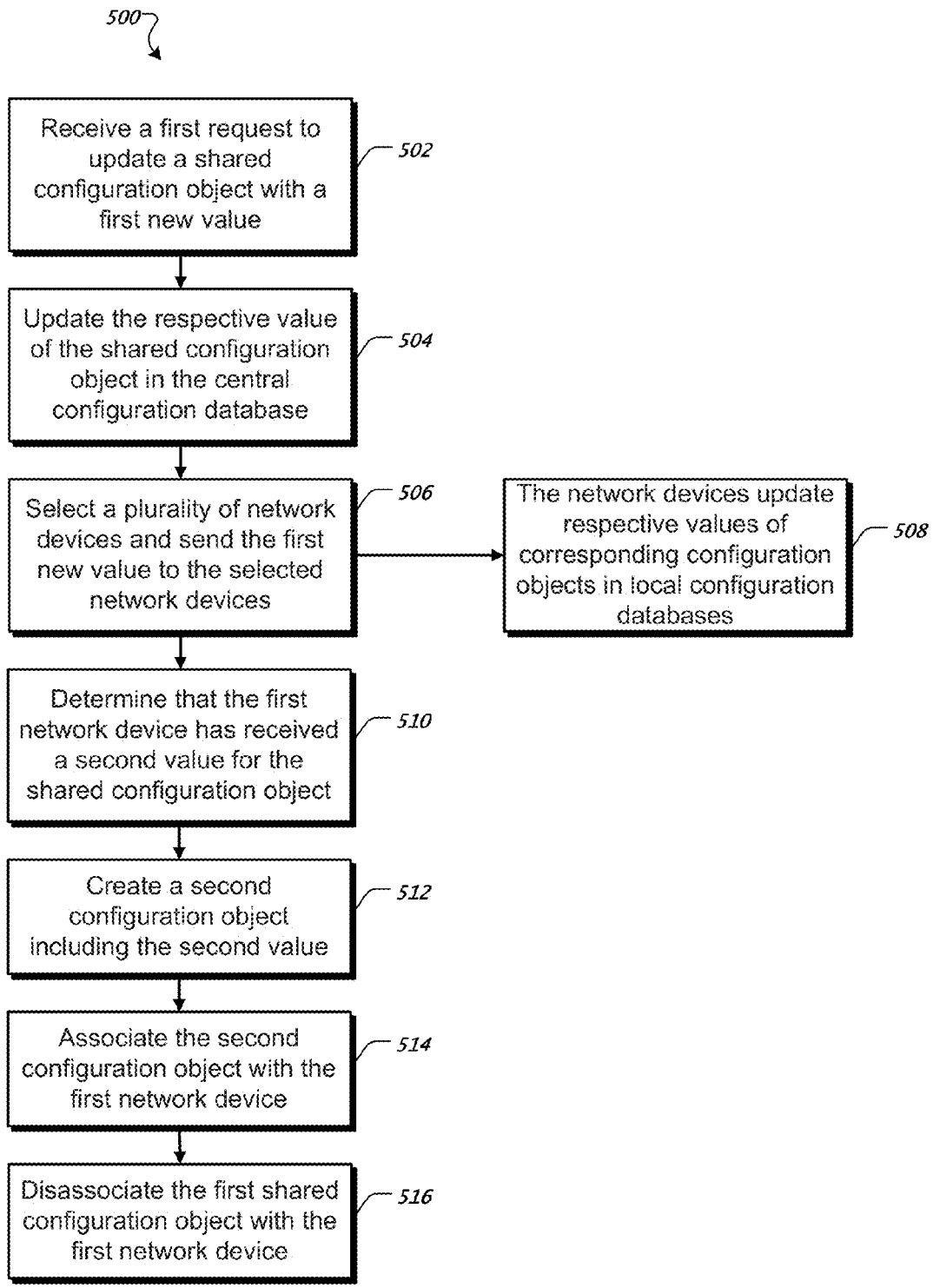
FIG. 5 is a flow diagram of an example technique performed by a central management system for configuring network devices.
Figure 6:
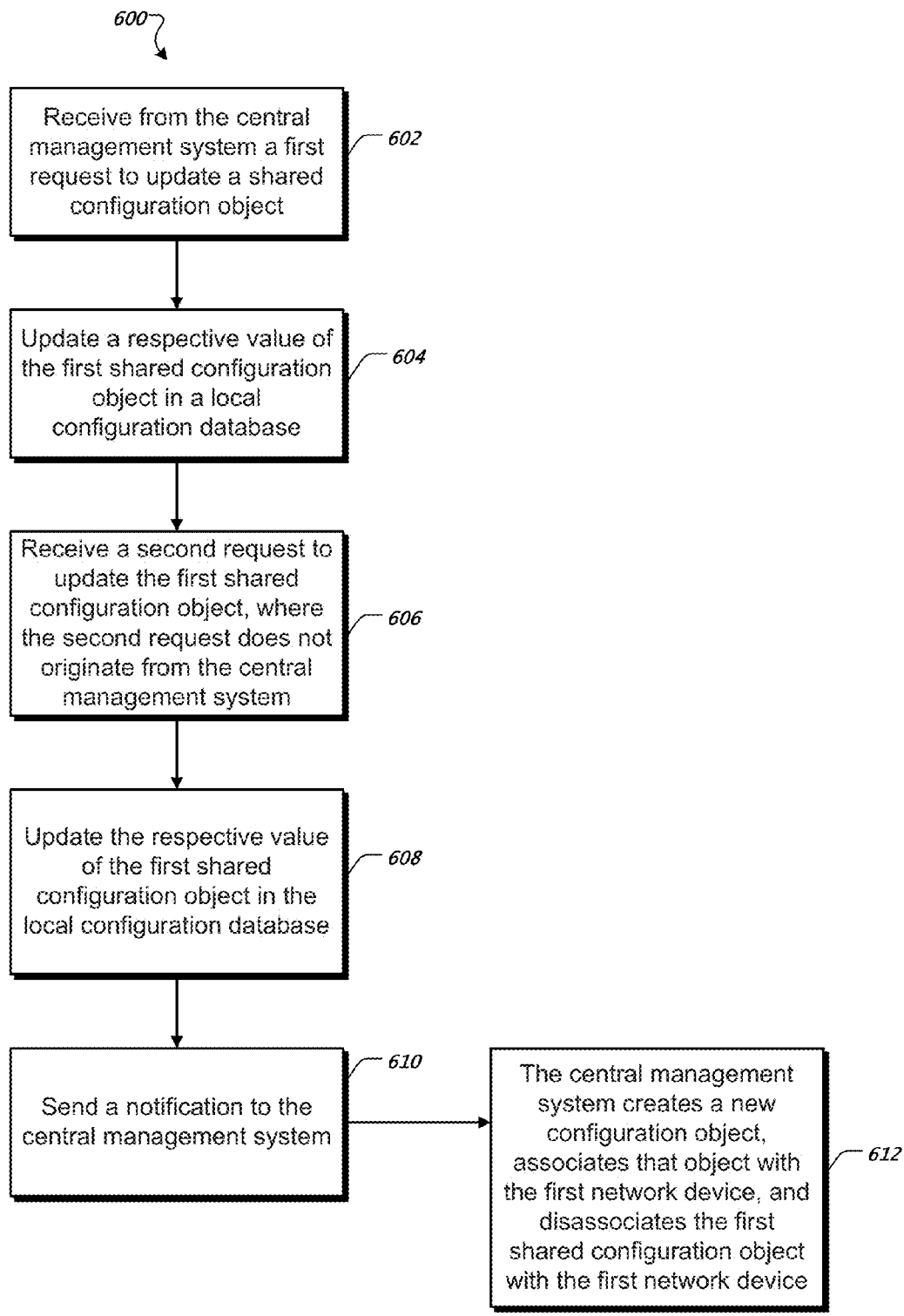
FIG. 6 is a flow diagram of an example technique performed by a first network device for configuring the first network device at the first network device.

FIGS. 5 and 6 are flow diagrams of example techniques to ensure that corresponding shared configuration objects have matching respective values even though network administrators can change respective values at both a central management system and at network devices. In some implementations, network devices send updated values to the central management system when they are updated. In other implementations, the central management system periodically polls the network devices.

FIG. 5 is a flow diagram of an example technique 500 performed by a central management system (e.g., central management system 102, although various central management systems are possible) for configuring network devices.

The central management system stores shared configuration objects in a central configuration database for the central management system. Each shared configuration object can be used by a network device to process packets.

Each shared configuration object is associated with at least one network device. In some implementations, the central management system keeps track of what network devices are associated with each shared configuration object, for example, in a table, list, or other data structure (for instance, in the central configuration database). In other implementations, the shared configuration objects are associated with all network devices that the central management system is managing.

The central management system receives a request to update a respective value of a first shared configuration object in the central configuration database with a first new value (step 502). In some implementations, the central management system receives the request from a network administrator (e.g., network administrator 114). In other implementations, the central management system receives the request from a process, for example, a script that monitors network conditions and adjusts configuration information depending on the monitored network conditions.

The central management system updates the respective value of the first shared configuration object in the central configuration database with the first new value (step 504). In some implementations, the central management system keeps a copy of the previous value, for example, on a back-up system.

Responsive to the request, the central management system selects one or more network devices and sends the first new value to the selected network devices (step 506). The central management system selects the particular selected network devices because the selected network devices are associated with the first shared configuration object. Each of the selected network devices stores a configuration object corresponding to the first shared configuration object of the central configuration database in a local configuration database.

In some implementations, the central management system selects an additional network device (or a plurality of additional network devices). The additional network device's local configuration database does not store a configuration object corresponding to the first shared configuration object of the central configuration database. The central management system sends the first new value to the additional network device The additional network device can be selected for various reasons. For example, in some cases, the central management system simply selects all of the network devices that it is managing (for instance, at the direction of a network administrator), including the additional network device, even though the additional network device does not store a configuration object corresponding to the first shared configuration object of the central configuration database.

In those cases, the additional network device can take various actions when it receives the first new value. For example, in some implementations, the additional network device determines that the first shared configuration object of the central configuration database is not relevant (for instance, where the additional network device is not performing routing but the first shared configuration object specifies information used for routing). The additional network device makes the determination using various techniques, for example, by comparing the first shared configuration object with a list of relevant configuration objects. The additional network device optionally sends an error message to the central management system when it determines that the first shared configuration object is not relevant.

In another example, the additional network device creates a new configuration object in the additional network device's local configuration database corresponding to the first shared configuration object of the central configuration database. The additional network device updates a respective value of the new configuration object in the additional network device's local configuration database with the first new value. If the first shared configuration object of the central configuration database is not relevant to the additional network device, then the additional network device ignores the first new value although it is stored in the additional network device's local configuration database.

Responsive to receiving the first value, each selected network device updates a respective value of the network device's configuration object corresponding to the first shared configuration object in the network device's local configuration database with the first new value (step 508, not performed by the central management system). In some implementations, the selected network devices acknowledge receipt of the first new value, for example, by sending an acknowledgement message to the central management system.

The central management system determines that a first network device of the plurality of network devices has received another request to update the respective value of the first network device's configuration object corresponding to the first shared configuration object with a second value (step 510). The request did not originate from the central management system.

The central management system can determine that the first network device has received the request using various techniques. In some implementations, the central management system receives from the first network device a notification that it received the request. For example, the first network device can send the notification to the central management system automatically when it receives a new values for shared configuration objects not originating from the central management system.

In various implementations, the central management system periodically polls network devices to determine whether one of them has received a new value for a shared configuration object not originating from the central management system. For example, the central management system can send a message to each of the network devices that it manages once every period (for instance, once every minute) requesting any new values for shared configuration objects.

Responsive to determining that the first network device received the request, the central management system creates a second configuration object in the central configuration database (step 512). The central management system updates the respective value of the second configuration object with the second new value.

The central management system associates the second configuration object with the first network device (step 514). The central management system disassociates the first shared configuration object with the first network device (step 516).

Because the first shared configuration object is no longer associated with the first network device, any subsequent updates to the respective value of the first shared configuration object at the central management system will not be sent to the first network device. A network administrator who wishes to change that value at the first network device can update the respective value of the second configuration object at the central management system or update the respective value directly at the first network device.

FIG. 6 is a flow diagram of an example technique 600 performed by a first network device for configuring the first network device (e.g., network device 504) at the first network device.

The first network device stores shared configuration objects and device-specific configuration objects in a local configuration database for the first network device. Each shared configuration object in the local configuration database corresponds to a shared configuration object in a central configuration database for a central management system (e.g., central management system 102, although various central management systems are possible). Each shared configuration object in the central configuration database is associated with at least one network device.

Each device-specific configuration object is not stored in the central configuration database for the central management system. Each device-specific configuration object and each shared configuration object can be used by the first network device to process packets at the first network device.

The first network device receives a request from the central management system to update a respective value of a first shared configuration object in the local configuration database with a first new value (step 602). The central management system determined the new value based on, for example, input from a network administrator or from feedback it received from various network devices. In some implementations, the first network device acknowledges receipt of the first new value, for example, by sending an acknowledgement message to the central management system.

The first network device updates the respective value of the first shared configuration object in the local configuration database with the first new value (step 604). In some cases, the first network device configures itself to process one or more packets using the first new value.

The first network device receives another request to update the respective value of the first shared configuration object in the local configuration database with a second new value (step 606). The request does not originate from the central management system. For example, the request can be from a network administrator communicating directly with the first network device. In another example, the request is from a process running on the first network device, for instance, a process that monitors network traffic adjusts configuration information to meet network objectives. Typically, the first network device updates the respective value of the first shared configuration object in the local configuration database (step 608).

The first network device sends a notification to the central management system that the first network device received the request (step 610). In some implementations, the first network device sends the notification automatically when it receives a request not originating from the central management system. In other implementations, the first network device sends the notification in response to a request from the central management system. For example, the central management system can periodically poll the network devices to determine whether there are any new values for shared configuration objects. In that example, the first network device notifies the central management system in response to a polling message from the central management system.

Responsive to the notification, the central management system creates a second configuration object in the central configuration database (step 612, not performed by the first network device). The central management system updates the respective value of the second configuration object with the second new value. The central management system associates the second configuration object with the first network device. The central management system disassociates the first shared configuration object with the first network device.

Figure 7A:
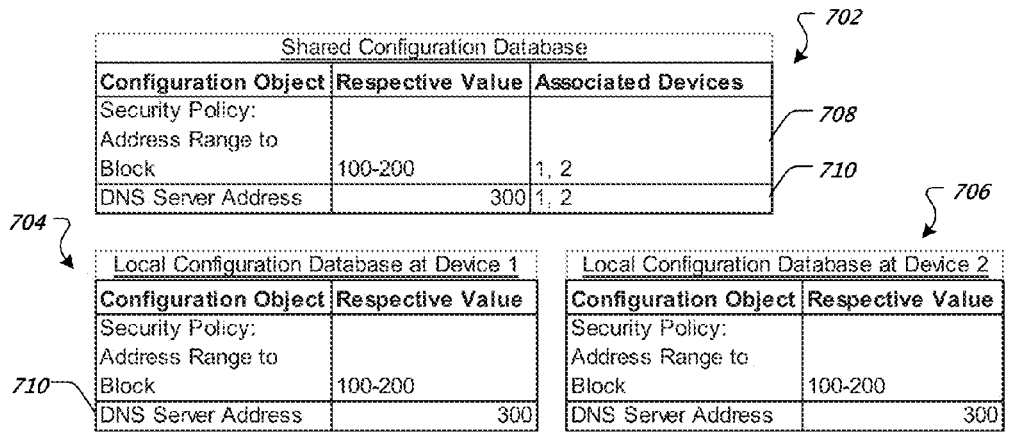
FIG. 7A shows three example configuration databases represented by tables.
Figure 7B:
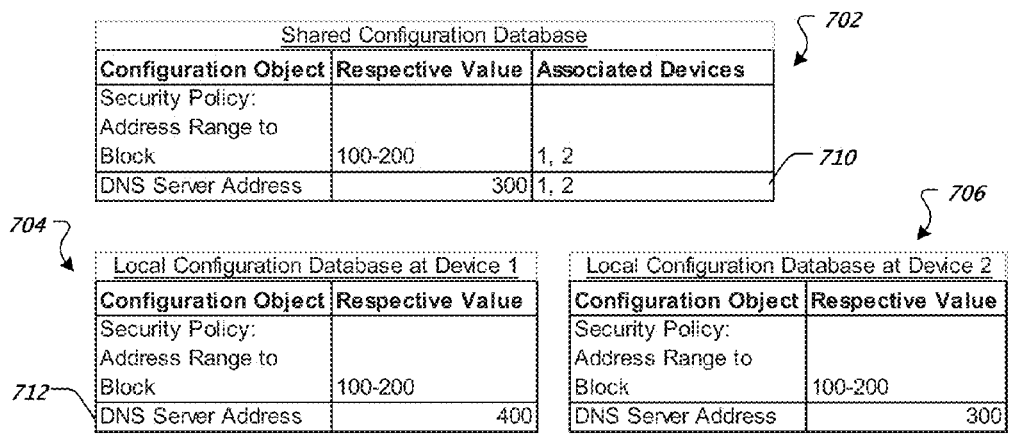
FIG. 7B shows the three tables after the first example network device receives a new value for one of its configuration objects.
Figure 7C:
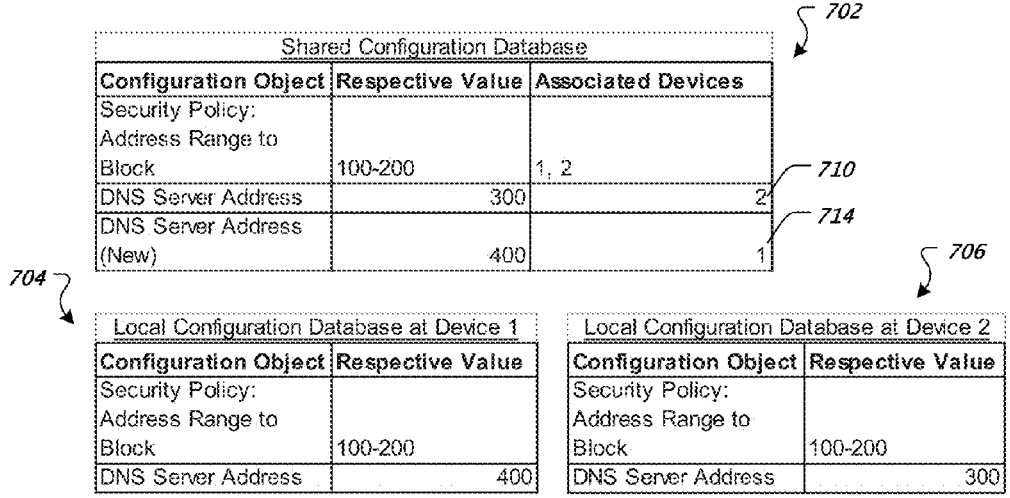
FIG. 7C shows the three tables after the central management system determines that the first example network device received a new value for a shared configuration object.

FIGS. 7A, 7B, and 7C demonstrate the techniques 500 and 600 diagrammed in FIGS. 5 and 6 by showing three example configuration databases represented by tables 702, 704, and 706 as those databases would change during an example operation of the techniques 600 and 700. The first table 702 represents an example central configuration database for an example central management system. The second table 704 represents an example local configuration database for a first network device. The third table 706 represents an example configuration database for a second network device.

FIG. 7A shows three example configuration databases represented by tables 702, 704, and 706.

The first table 702, representing an example shared configuration database, includes two rows 708 and 710 representing example shared configuration objects. The shared configuration object in the first row 708 specifies a security policy, in particular, a range of addresses to block The respective value of the shared configuration object in the first row 708 is 100-200, indicating that network traffic from those address is to be blocked. The shared configuration objected in the second row 710 specifies a DNS server address, and its respective value is 300. Both of these configuration objects are associated with the first and second network devices.

The second table 704 and the third table 706 represent example local configuration databases. The example local configuration databases include configuration objects corresponding to shared configuration objects in the central configuration database. In this example, both of the example shared configuration objects shown are associated with both network devices, so both tables 704 and 706 show corresponding configuration objects. For example, the second table 704 shows a DNS server address configuration object in its second row 712 with an associated value of 300.

FIG. 7B shows the three tables 702, 704, and 706 after the first example network device receives a new value for one of its configuration objects. The first example network device receives the new value from, for example, a network administrator. The new value does not originate from the central management system.

The second row 712 of the second table 704 shows that the DNS server address configuration object has an associated value of 400 now instead of 300. However, at this point, the second row 712 of the first table 702 still indicates that the DNS server address configuration object has an associated value of 300 and is associated with both the first and second example network devices.

FIG. 7C shows the three tables 702, 704, and 706 after the central management system determines that the first example network device received a new value for a shared configuration object.

The DNS server address configuration object represented by the second row 710 of the first table 702 is now associated with only the second example network device and not the first example network device. A new DNS server address configuration object is represented by a third row 714 of the first table 702. The new DNS server address configuration object is associated with the first example network device.

The original DNS server address configuration object represented by the second row 710 of the first table 702 still has an associated value of 300. The new DNS server address configuration object represented by the third row 714 of the first table 702 has an associated value of 400.

If the associated value of the original DNS server address configuration object changes at the central management system, the central management system will send the new value to the second example network device and not the first example network device. The DNS server address configuration object at the first example network device can still be changed at the central management system by changing the new DNS server address configuration object at the central management system (represented by the third row 714 in the first table 702).

Figure 8:
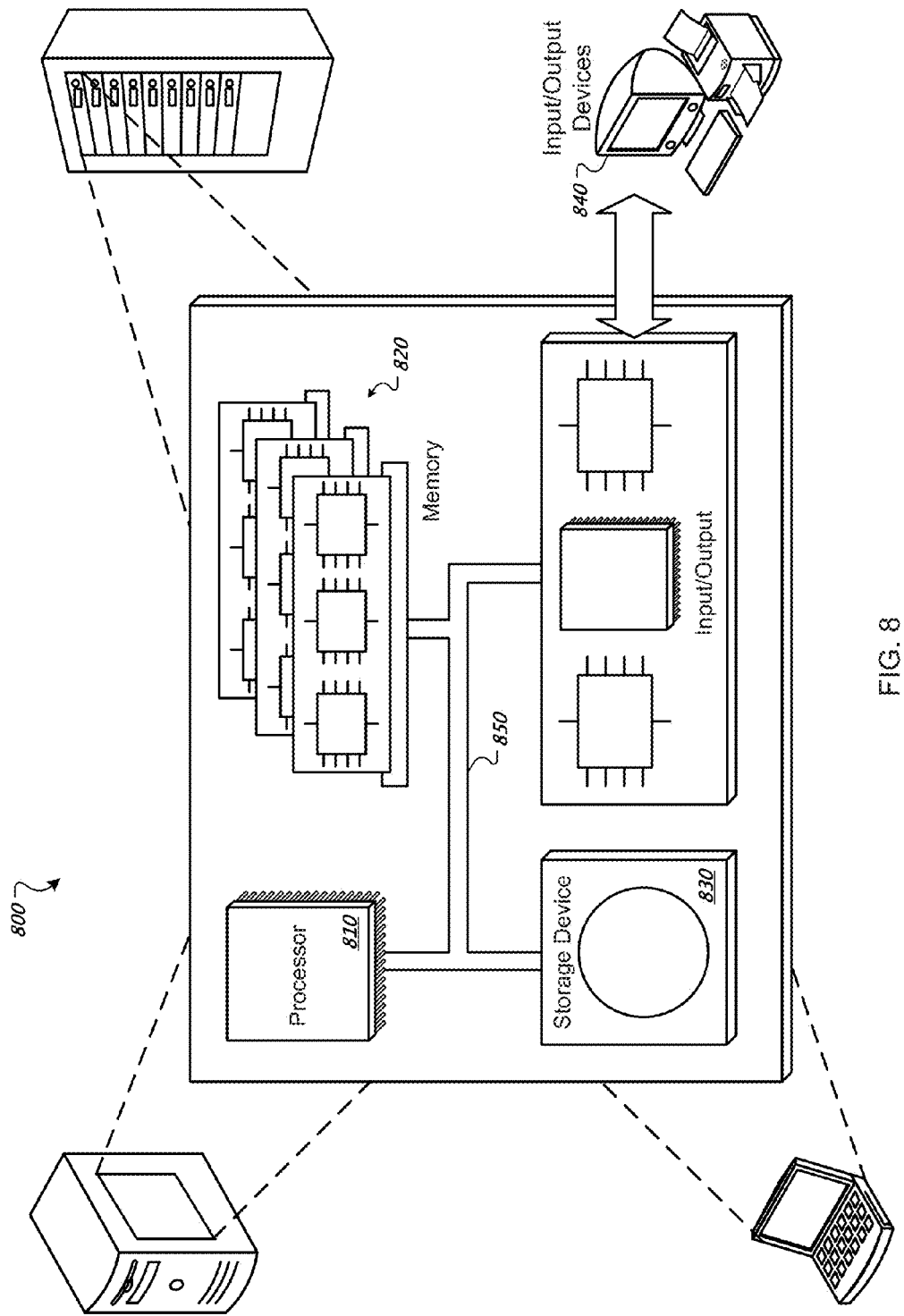
FIG. 8 is a schematic diagram of a generic computer system.

FIG. 8 is a schematic diagram of a generic computer system 800. The system 800 can be used for practicing operations described in association with the techniques 200, 300, 500, and 600 in FIGS. 2, 3, 5, and 6. For example, a central management system can be implemented using one or more computer systems. In another example, a network device can be implemented using one or more computer systems. In some implementations, network devices include custom hardware, for instance, additional input/output devices for connecting to networks.

The system 800 can include a processor 810, a memory 820, a storage device 830, and input/output devices 840. Each of the components 810, 820, 830, and 840 are interconnected using a system bus 850. The processor 810 is capable of processing instructions for execution within the system 800. Such executed instructions can implement one or more components of a central management system, for example. In some implementations, the processor 810 is a single-threaded processor. In other implementations, the processor 810 is a multi-threaded processor. The processor 810 is capable of processing instructions stored in the memory 820 or on the storage device 830 to display graphical information for a user interface on the input/output device 840.

The memory 820 is a computer readable medium such as volatile or non volatile that stores information within the system 800. The memory 820 can store data structures representing configuration object databases, for example. The storage device 830 is capable of providing persistent storage for the system 800. The storage device 830 can be a floppy disk device, a hard disk device, an optical disk device, or a tape device, or other suitable persistent storage means. The input/output device 840 provides input/output operations for the system 800. In some implementations, the input/output device 840 includes a keyboard and/or pointing device. In various implementations, the input/output device 840 includes a display unit for displaying graphical user interfaces.

The input/output device 840 can provide input/output operations for a network device. For example, the input/output device 840 can include Ethernet ports or other networking ports to communicate with computer networks.

Various implementations of the systems and techniques described here can be realized in digital electronic circuitry, integrated circuitry, specially designed ASICs (application specific integrated circuits), computer hardware, firmware, executing software, non-executing software, or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

In some implementations, users can interact with a network device using a computer on a network. For example, a user on a personal computer can interact with a network device connected on the network using a web browser, a Secure Shell (SSH) client, a telnet client, or the like. In various implementations, a user can interact with a network device using a computer connected to the security device on a serial port, for example, a Recommended Standard 232 (RS-232) port.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

While this specification contains many implementation details, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results.

What is claimed is:

1. A method performed by a first network device for configuring the first network device using a central management system, the method comprising:
  receiving a first request originating from the central management system to update a respective value of a first configuration object corresponding to a shared configuration object that is stored at a central configuration database associated with the central management system with a first new value, wherein a second configuration object corresponding to the shared configuration object is stored at a second local configuration database associated with a second network device, wherein the second network device is configured to receive the first request originating from the central management system and update the second configuration object corresponding to the shared configuration object that is stored at the second local configuration database associated with the second network device with the first new value;
  determining that the first configuration object corresponding to the shared configuration object is not stored in a first local configuration data store associated with the first network device;
  determining whether the shared configuration object is relevant for the first network device, in the event that the shared configuration object is determined to be relevant, creating the first configuration object corresponding to the shared configuration object in the first local configuration data store associated with the first network device and updating the first configuration object with the first new value, wherein determining whether the shared configuration object is relevant for the first network device is based at least in part on comparing the shared configuration object with a list of relevant configuration objects;
  receiving a second request to update the value of the first configuration object corresponding to the shared configuration object in the first local configuration data store associated with the first network device with a second new value;
  determining whether the second request originated from the central management system; and in the event that the second request did not originate from the central management system, rejecting the second request to update the value of the first configuration object.

2. The method of claim 1, wherein in the event that the shared configuration object is determined to be irrelevant for the first network device, storing the first new value in the first local configuration data store associated with the first network device.

3. The method of claim 1, wherein in the event that the shared configuration object is determined to be irrelevant for the first network device, sending an error message associated with the first request to the central management system.

4. The method of claim 1, wherein in the event that the shared configuration object is determined to be irrelevant for the first network device, discarding the first new value.

5. The method of claim 1, wherein:
the first network device comprises a routing device; and
the shared configuration object comprises a Domain Name Service (DNS) server address.

6. The method of claim 1, wherein the first network device is selected by the central management system to which to send the first request based at least in part on the first configuration object corresponding to the shared configuration object not being stored in the first local configuration data store.

7. The method of claim 1, wherein the first network device comprises a security device or a Virtual Private Network (VPN) server.

8. The method of claim 1, wherein the first network device is configured to select a stored configuration object from a plurality of configuration objects stored in the first local configuration data store based on a priority list in order to process a first packet, wherein the priority list comprises a processing order for the plurality of configuration objects.

9. The method of claim 1, wherein in the event that the second request originated from the central management system, updating the value of the configuration object in the first local configuration data store with the second new value.

10. A system, comprising:
a first network device comprising one or more processors and one or more network interfaces;
wherein the first network device has encoded on a non-transitory computer-readable medium instructions operable to cause one or more of the processors of the first network device to perform operations comprising:
receiving a first request originating from a central management system to update a respective value of a first configuration object corresponding to a shared configuration object that is stored at a central configuration database associated with the central management system with a first new value, wherein a second configuration object corresponding to the shared configuration object is stored at a second local configuration database associated with a second network device, wherein the second network device is configured to receive the first request originating from the central management system and update the second configuration object corresponding to the shared configuration object that is stored at the second local configuration database associated with the second network device with the first new value;
determining that the first configuration object corresponding to the shared configuration object is not stored in a first local configuration data store associated with the first network device;
determining whether the shared configuration object is relevant for the first network device, in the event that the shared configuration object is determined to be relevant, creating the first configuration object corresponding to the shared configuration object in the first local configuration data store associated with the first network device and updating the first configuration object with the first new value, wherein determining whether the shared configuration object is relevant for the first network device is based at least in part on comparing the shared configuration object with a list of relevant configuration objects;
receiving a second request to update the value of the first configuration object corresponding to the shared configuration object in the first local configuration data store associated with the first network device with a second new value;
determining whether the second request originated from the central management system; and
in the event that the second request did not originate from the central management system, rejecting the second request to update the value of the first configuration object.

11. The system of claim 10, wherein in the event that the shared configuration object is determined to be irrelevant for the first network device, storing the first new value in the first local configuration data store associated with the first network device.

12. The system of claim 10, wherein in the event that the shared configuration object is determined to be irrelevant for the first network device, sending an error message associated with the first request to the central management system.

13. The system of claim 10, wherein in the event that the shared configuration object is determined to be irrelevant for the first network device, discarding the first new value.

14. The system of claim 10, wherein:
the first network device comprises a routing device; and
the shared configuration object comprises a Domain Name Service (DNS) server address.

15. The system of claim 10, wherein the first network device is selected by the central management system to which to send the first request based at least in part on the first configuration object corresponding to the shared configuration object not being stored in the first local configuration data store.

16. The system of claim 10, wherein the first network device comprises a security device or a Virtual Private Network (VPN) server.

17. The system of claim 10, wherein the first network device is configured to select a stored configuration object from a plurality of configuration objects stored in the first local configuration data store based on a priority list in order to process a first packet, wherein the priority list comprises a processing order for the plurality of configuration objects.

18. A computer program product, encoded on a non-transitory computer-readable storage device, operable to cause a first network device to perform operations comprising:
receiving a first request originating from a central management system to update a respective value of a first configuration object corresponding to a shared configuration object that is stored at a central configuration database associated with the central management system with a first new value, wherein a second configuration object corresponding to the shared configuration object is stored at a second local configuration database associated with a second network device, wherein the second network device is configured to receive the first request originating from the central management system and update the second configuration object corresponding to the shared configuration object that is stored at the second local configuration database associated with the second network device with the first new value;

determining that the first configuration object corresponding to the shared configuration object is not stored in a first local configuration data store associated with the first network device;

determining whether the shared configuration object is relevant for the first network device, in the event that the shared configuration object is determined to be relevant, creating the configuration object corresponding to the shared configuration object in the first local configuration data store associated with the first network device and updating the first configuration object with the first new value, wherein determining whether the shared configuration object is relevant for the first network device is based at least in part on comparing the shared configuration object with a list of relevant configuration objects;

receiving a second request to update the value of the first configuration object corresponding to the shared configuration object in the first local configuration data store associated with the first network device with a second new value;

determining whether the second request originated from the central management system; and in the event that the second request did not originate from the central management system, rejecting the second request to update the value of the first configuration object.

19. The computer program product of claim 18, wherein in the event that the shared configuration object is determined to be irrelevant for the first network device, storing the first new value in the first local configuration data store associated with the first network device.

20. The computer program product of claim 18, wherein in the event that the shared configuration object is determined to be irrelevant for the first network device, sending an error message associated with the first request to the central management system.

* * * * *